(12) United States Patent
Takata

(10) Patent No.: US 10,007,471 B2
(45) Date of Patent: Jun. 26, 2018

(54) PRINTING APPARATUS IN COMMUNICATION WITH SERVER VIA NETWORK

(71) Applicant: RISO KAGAKU CORPORATION, Tokyo (JP)

(72) Inventor: Atsushi Takata, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days. days.

(21) Appl. No.: 15/689,394

(22) Filed: Aug. 29, 2017

(65) Prior Publication Data

US 2018/0088876 A1    Mar. 29, 2018

(30) Foreign Application Priority Data

Sep. 27, 2016 (JP) .................................. 2016-187901

(51) Int. Cl.
*G06F 3/12* (2006.01)
*B41J 2/175* (2006.01)
*H04N 1/00* (2006.01)

(52) U.S. Cl.
CPC ........ *G06F 3/1236* (2013.01); *B41J 2/17566* (2013.01); *G06F 3/1253* (2013.01); *G06F 3/1279* (2013.01); *G06F 3/1288* (2013.01); *H04N 1/00087* (2013.01)

(58) Field of Classification Search
CPC .... G06F 3/1236; G06F 3/1256; G06F 3/1253; G06F 3/1288; B41J 2/17566; B41J 2/17593; H04N 1/00087
See application file for complete search history.

(56) References Cited

U.S. PATENT DOCUMENTS

| | | | | |
|---|---|---|---|---|
| 2003/0090688 | A1* | 5/2003 | Kimura | G06K 15/00 358/1.9 |
| 2015/0092206 | A1* | 4/2015 | Zaima | H04N 1/6033 358/1.9 |
| 2016/0292629 | A1* | 10/2016 | Matsuda | G06Q 10/087 |
| 2017/0048422 | A1* | 2/2017 | Sulistio | H04N 1/6041 |

FOREIGN PATENT DOCUMENTS

JP        2008-311892        12/2008

* cited by examiner

*Primary Examiner* — Moustapha Diaby
(74) *Attorney, Agent, or Firm* — Greenblum & Bernstein, P.L.C.

(57) ABSTRACT

A controller is configured to: acquire device configuration data indicating a configuration of the printer and expendable supply data indicating a characteristic of the expendable supply; drive the communication interface to send the device configuration data and the expendable supply data to the server; drive the communication interface to receive, from the server, pattern image data and calculation program data selected by the server based on the sent device configuration data and the sent expendable supply data, the pattern image data indicating a pattern image, the calculation program data being for use to analyze the pattern image; and analyze scanned image data using the calculation program data and calculate an image adjustment value for adjusting the printer, the scanned image data being acquired by scanning the pattern image printed by the printer.

4 Claims, 8 Drawing Sheets

| DEVICE CONFIGURATION DATA | INK DATA | PATTERN IMAGE DATA | CALCULATION PROGRAM DATA |
|---|---|---|---|
|  |  |  |  |
| ⋮ | ⋮ | ⋮ | ⋮ |

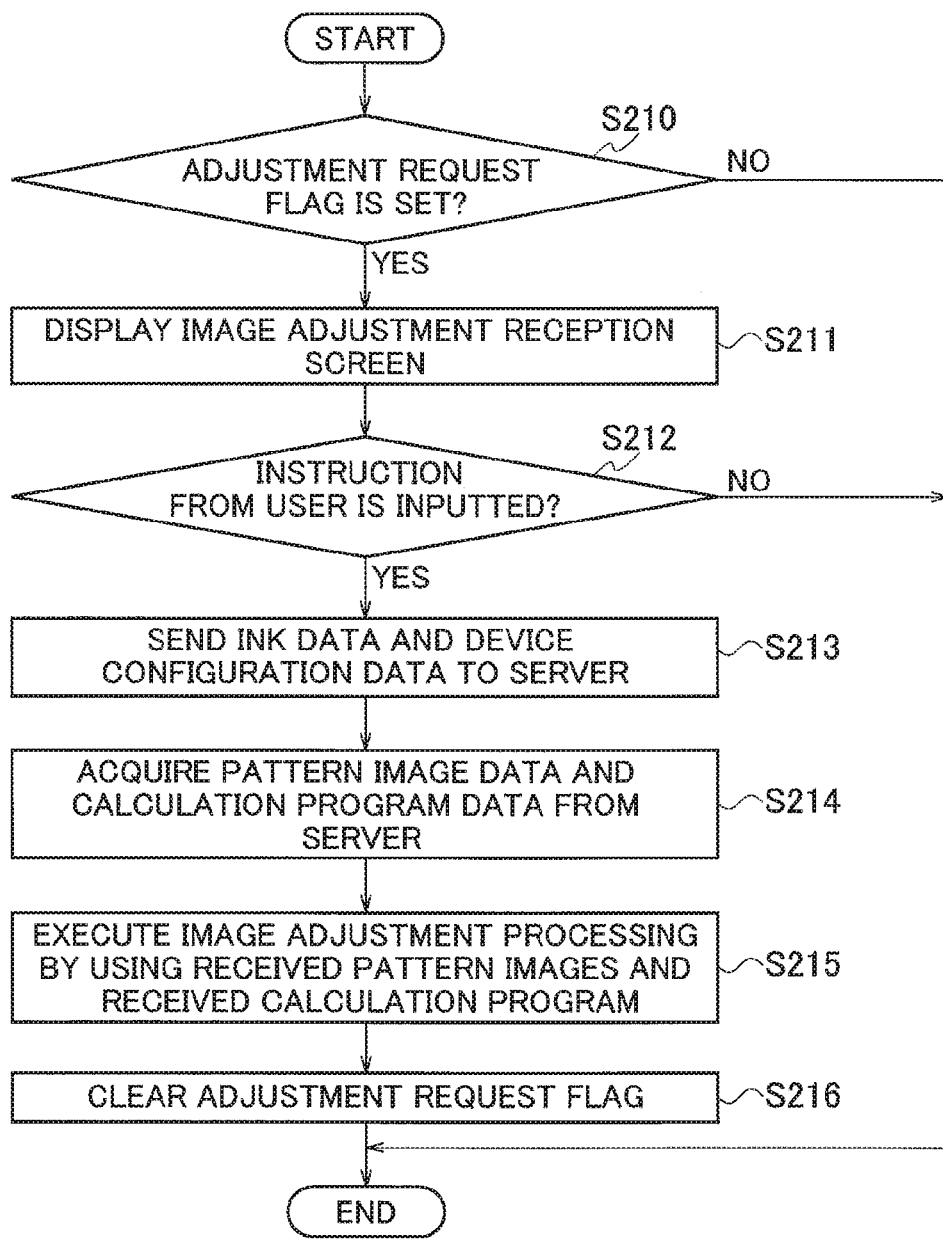

PRINTING APPARATUS IN COMMUNICATION WITH SERVER VIA NETWORK

CROSS REFERENCE TO RELATED APPLICATION

This application is based upon and claims the benefit of priority from the prior Japanese Patent Application No. 2016-187901, filed on Sep. 27, 2016, the entire contents of which are incorporated herein by reference.

BACKGROUND

1. Technical Field

The disclosure relates to a printing apparatus configured to communicate with a server via a network.

2. Related Art

In a printing apparatus such as an inkjet printing apparatus, various parameters such as color profiles are set and print processing of printing an image on a sheet is executed by using these parameters.

Some printing apparatuses regularly update such parameters to the latest parameters to further improve image quality. Japanese Patent Application Publication No. 2008-311892 describes a printing apparatus which can communicate with a server via a network and acquire the latest parameters from the server when being turned on.

Using the ability to easily acquire the latest parameters from the server, this printing apparatus can offer the usability enhanced by acquiring of the parameters.

SUMMARY

In some cases, a user desires to perform printing by using an ink different from inks provided in a printing apparatus in default such as a functional ink including a stealth ink made visible when irradiated with predetermined light or an ink of a spot color including a corporate color. In this case, an ink to be ejected from an inkjet head can be changed by replacing an ink cartridge mounted in the apparatus by a different ink cartridge containing the different ink. The printing apparatus can be thereby changed to be capable of performing printing using the ink desired by the user.

However, since the inks used in the printing apparatus vary in physical properties, the inks vary in ejection characteristics. Accordingly, when the ink is changed as described above, various image adjustment values such as an ink landing position need to be changed to surely obtain image quality.

Moreover, since the image adjustment values are specified unique to each of the inkjet heads in the printing apparatuses, the server cannot grasp which image adjustment values are currently best for each inkjet head. Accordingly, the aforementioned printing apparatus has an ability to acquire the parameters from the server, but is poor in usability because it cannot acquire the image adjustment values suitable after change of an ink by the user or the like.

An object of the present disclosure is to provide a printing apparatus capable of appropriately acquiring an image adjustment value in response to change of an ink or the like.

A printing apparatus in accordance with some embodiments includes: a communication interface configured to communicate with a server via a network; a printer configured to print an image using an expendable supply; and a controller configured to control the communication interface and the printer. The controller is configured to: acquire device configuration data indicating a configuration of the printer and expendable supply data indicating a characteristic of the expendable supply; drive the communication interface to send the device configuration data and the expendable supply data to the server; drive the communication interface to receive, from the server, pattern image data and calculation program data selected by the server based on the sent device configuration data and the sent expendable supply data, the pattern image data indicating a pattern image, the calculation program data being for use to analyze the pattern image; and analyze scanned image data using the calculation program data and calculate an image adjustment value for adjusting the printer, the scanned image data being acquired by scanning the pattern image printed by the printer.

In the configuration described above, the printing apparatus can acquire the pattern image data and the calculation program data for use to analyze the pattern image data from the server and calculate the image adjustment value in such cases where, for example, the ink provided in the printing apparatus in default is changed to the different ink. Accordingly, the printing apparatus can appropriately acquire the image adjustment value in response to the change of the ink and the like.

Moreover, the server can select the pattern image data and the calculation program data optimal for the device configuration data and the expendable supply data. Accordingly, the printing apparatus can optimize the image adjustment value based on the optimal pattern image data and calculation program data, and suppress a decrease in image quality.

The printing apparatus may further include a storage configured to store previous device configuration data set before the device configuration data and previous expendable supply data indicating a characteristic of a previous expendable supply used before the expendable supply. The controller may determine whether to send the device configuration data and the expendable supply data to the server, based on a result of comparison between the previous device configuration data and the device configuration data currently acquired and a result of comparison between the previous expendable supply data and the expendable supply data currently acquired.

In the aforementioned configuration, the printing apparatus sends the device configuration data and the expendable supply data to the server only when the sending is determined to be necessary based on the comparison results. Accordingly, it is possible to prevent unnecessary sending of the device configuration data and the expendable supply data and to prevent receiving of the unnecessary pattern image data and the unnecessary calculation program data from the server. Moreover, preventing the receiving of the unnecessary pattern image data and the unnecessary calculation program data from the server can prevent a calculating section from wastefully executing the processing (image adjustment processing) of calculating the image adjustment value by using the calculation program data.

The printing apparatus may further include an expendable supply data storage included in an expendable supply cartridge containing the expendable supply. The controller may acquire the expendable supply data from the expendable supply data storage.

In the aforementioned configuration, the expendable supply data can be easily acquired from the expendable supply data storage without the user performing work of inputting the expendable supply data and the like. Accordingly, the usability is enhanced by acquiring the expendable supply data.

BRIEF DESCRIPTION OF DRAWINGS

FIG. 9 is a flowchart depicting operations of the printing apparatus in the embodiment.

DETAILED DESCRIPTION

Figure 1:
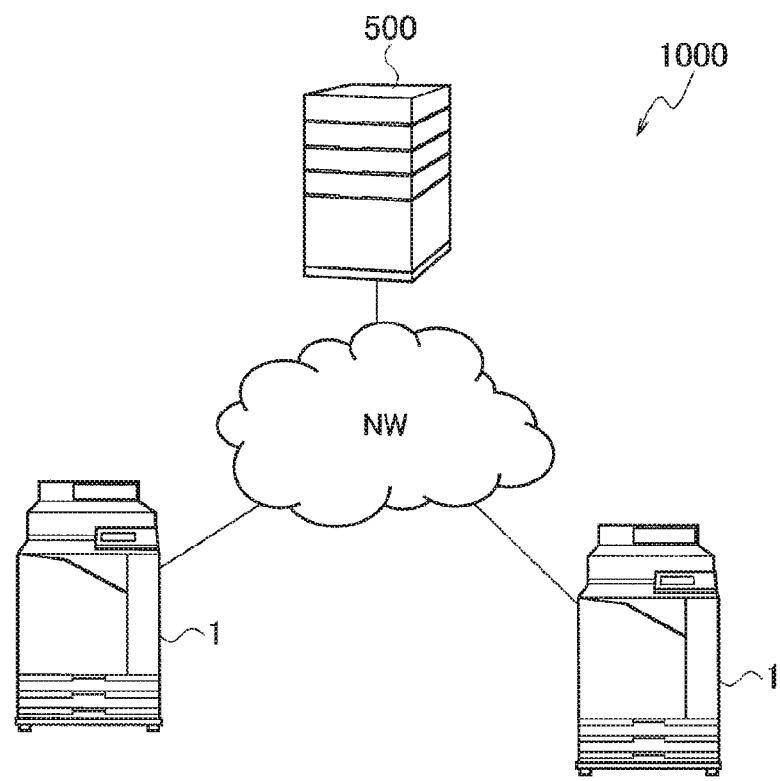
FIG. 1 is a schematic configuration diagram of a print system in an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

FIG. 1 is a schematic configuration diagram of a print system 1000 including printing apparatuses in an embodiment of the present invention.

As illustrated in FIG. 1, the print system 1000 includes inkjet printing apparatuses 1 and a server 500. A network NW may be a wired communication network NW or a wireless communication network NW and is not limited to a particular network. The network NW consists of, for example, a local area network (LAN).

The inkjet printing apparatuses 1 communicate with the server 500 via the network NW. The inkjet printing apparatuses 1 execute print processing by using various types of data acquired by communicating with the server 500.

Figure 2:
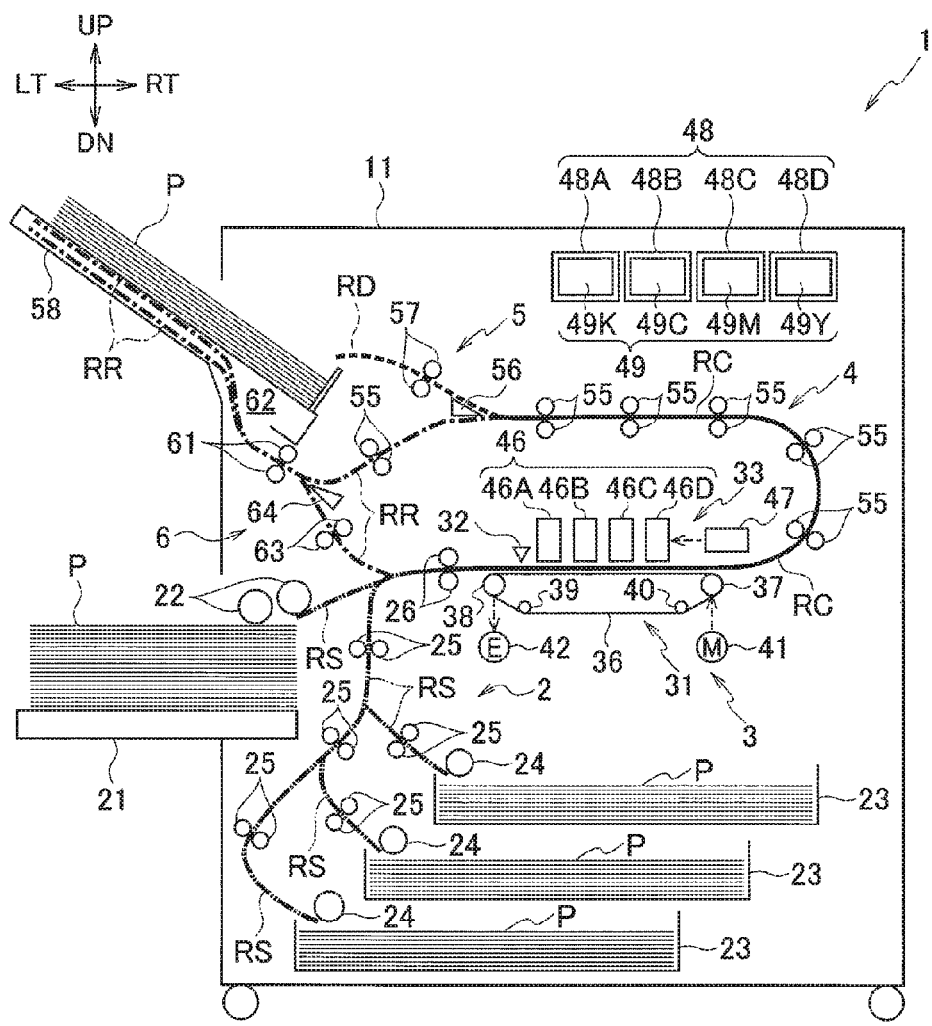
FIG. 2 is a schematic configuration diagram of a printing apparatus in the embodiment.
Figure 3:
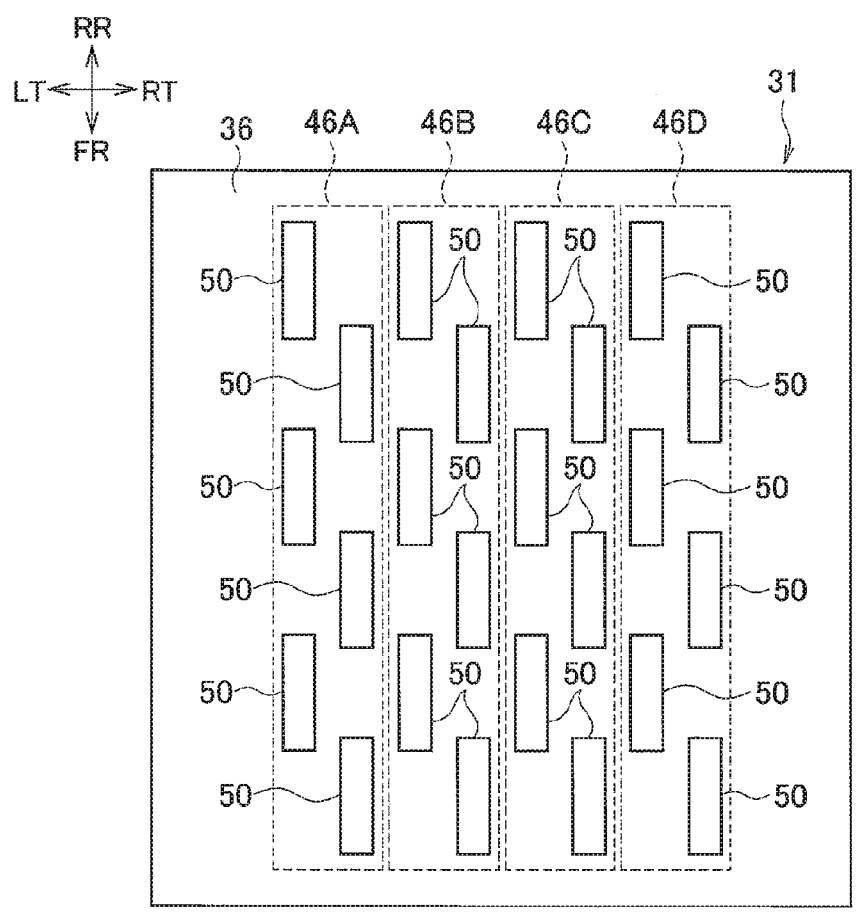
FIG. 3 is a block diagram illustrating functions of the printing apparatus in the embodiment.

FIG. 2 is a schematic configuration diagram of each inkjet printing apparatus 1. In the following description, a direction orthogonal to a sheet plane of FIG. 2 is a front-rear direction and a direction from the sheet surface toward a viewer is a front direction. In FIGS. 2 and 3, right, left, up, down, front, and rear are denoted by RT, LT, UP, DN, FR, and RR, respectively.

A route illustrated by bold lines in FIG. 2 is a conveyance route through which sheets being print media are conveyed. In the conveyance route, a route illustrated by a solid line is a normal route RC, a route illustrated by one-dot chain lines is a reverse route RR, a route illustrated by a broken line is a sheet discharge route RD, and a route illustrated by two-dot chain lines is a sheet feed route RS. In the following description, upstream and downstream mean upstream and downstream in the conveyance route.

As illustrated in FIG. 2, the inkjet printing apparatus 1 includes a sheet feeder 2, a conveyance printing unit 3, an upper conveyer 4, a sheet discharger 5, a reverse unit 6, and a case 1A configured to house or hold the aforementioned units.

The sheet feeder 2 feeds sheets P. The sheet feeder 2 is arranged upstream of all the other units in the conveyance route. The sheet feeder 2 includes an external sheet feed tray 21, external sheet feed rollers 22, multiple internal sheet feed trays 23, multiple internal sheet feed rollers 24, multiple pairs of vertical conveyance rollers 25, and registration rollers 26.

The external sheet feed tray 21 is a tray on which the sheets P used for printing are stacked. The external sheet feed tray 21 is installed to be partially exposed to the outside of the case 1A.

The external sheet feed rollers 22 pick up the sheets P from the external sheet feed tray 21 one by one, and convey the sheets P along the sheet feed route RS toward registration rollers 26. The external sheet feed rollers 22 are driven by a not-illustrated motor.

The internal sheet feed trays 23 are trays on which the sheets P used for printing are stacked. The internal sheet feed trays 23 are arranged inside the case 1A.

The internal sheet feed rollers 24 each pick up the sheets P from a corresponding one of the internal sheet feed trays 23 one by one, and send the sheets P to the sheet feed route RS. The internal sheet feed rollers 24 are driven by a not-illustrated motor.

The vertical conveyance rollers 25 convey the sheets P picked up from the internal sheet feed trays 23, to the registration rollers 26. The vertical conveyance rollers 25 are arranged along the sheet feed route RS. The vertical conveyance rollers 25 are driven by a not-illustrated motor.

The registration rollers 26 temporarily stop each of the sheets P conveyed from the external sheet feed tray 21, the internal sheet feed trays 23, and the reverse unit 6, and then convey the sheet P toward the conveyance printing unit 3. The registration rollers 26 are arranged in the normal route RC near a point where the sheet feed route RS and the reverse route RR merge. The registration rollers 26 are driven by a not-illustrated motor.

The conveyance printing unit 3 prints an image on each sheet P fed by the sheet feeder 2, while conveying the sheet P. The conveyance printing unit 3 includes a belt conveyer 31, a sheet sensor 32, and a printer 33.

The belt conveyer 31 conveys the sheet P conveyed from the registration rollers 26. The belt conveyer 31 is arranged downstream of the registration rollers 26. The belt conveyer 31 includes a conveyer belt 36, a drive roller 37, driven rollers 38, 39, 40, a belt motor 41, and an encoder 42.

The conveyer belt 36 conveys the sheet P while sucking and holding the sheet P. The conveyer belt 36 is an annular belt wound around the drive roller 37 and the driven rollers 38 to 40. Many through holes are formed in the conveyer belt 36. The conveyer belt 36 sucks and holds the sheet P by using sucking force generated at the through holes by drive of a fan (not illustrated). The conveyer belt 36 is rotated clockwise in FIG. 2 to convey the sucked and held sheet P in the direction from left to right.

The drive roller 37 rotates the conveyer belt 36 while supporting the conveyer belt 36, together with the driven rollers 38 to 40.

The driven rollers 38 to 40 support the conveyer belt 36 together with the drive roller 37. The driven rollers 38 to 40 are driven by the drive roller 37 via the conveyer belt 36. The driven roller 38 is arranged on the left side of the drive roller 37 at the same height as the drive roller 37. The driven rollers 39 and 40 are arranged below the drive roller 37 and the driven roller 38, at the same height while being spaced away from each other in a left-right direction.

The belt motor 41 rotationally drives the drive roller 37.

The encoder 42 outputs a pulse signal every time the driven roller 38 rotates by a predetermined angle.

The sheet sensor 32 detects the sheet P conveyed by the belt conveyer 31. The sheet sensor 32 is arranged above the conveyer belt 36, near and upstream of inkjet heads 46 to be described later. An optical sensor having a light emitting element and a light receiving element can be used as the sheet sensor 32.

The printer 33 prints an image on the sheet P by using multiple color inks. The printer 33 includes inkjet heads 46A, 46B, 46C, 46D, a head driver 47, ink cartridge mounting portions 48A, 48B, 48C, 48D, and ink cartridges 49K, 49C, 49M, 49Y. Moreover, the ink corresponds to an expendable supply.

Note that, in the following description, the inkjet heads 46A to 46D, the ink cartridge mounting portions 48A to 48D, and the ink cartridges 49K, 49C, 49M, 49Y are sometimes generally referred to by omitting the attached alphabets (A to D, K, C, M, and Y) as appropriate.

The inkjet heads 46A, 46B, 46C, 46D respectively eject the inks supplied from the ink cartridges 49K, 49C, 49M, 49Y mounted on the ink cartridge mounting portions 48A, 48B, 48C, 48D. Specifically, the inkjet heads 46A, 46B, 46C, 46D respectively eject a black (K) ink, a cyan (C) ink, a magenta (M) ink, and a yellow (Y) ink. The inkjet heads 46A to 46D are arranged above the belt conveyer 31 to be aligned in the conveyance direction of the sheet P (left-right direction). Moreover, as illustrated in FIG. 3, the inkjet heads 46A to 46D each have six head modules 50.

The head modules 50 each have multiple nozzles (not illustrated) aligned in a main scanning direction (front-rear direction) at a predetermined pitch, and eject the inks from the nozzles. The inks are supplied from the ink cartridges 49 to the head modules 50 via not-illustrated ink passages. In each of the inkjet heads 46, the six head modules 50 are arranged in the front-rear direction (main scanning direction) in a zigzag pattern. Specifically, the six head modules 50 are arranged in the front-rear direction with their positions being alternately shifted from one another in the left-right direction (sub-scanning direction).

Each of the head modules 50 includes an ink chamber (not illustrated) for storing the ink supplied from the corresponding ink cartridge 49. Multiple pressure chambers (not illustrated) communicating with the respective nozzles are provided in the ink chamber. In each of the pressure chambers, partition walls with the adjacent pressure chambers are formed by two piezoelectric members (not illustrated) with opposite directions of polarization. Electrodes (not illustrated) are formed in tight contact with the partition walls with the adjacent pressure chambers. When drive voltage is applied to the electrodes, the partition walls are shear-deformed and the volume of the pressure chamber and the pressure inside the pressure chamber change. This causes the ink in the pressure chamber to be ejected from the nozzle.

The head driver 47 drives the inkjet heads 46. Specifically, the head driver 47 drives the pressure chambers by applying the drive voltage to the electrodes in the head modules 50 of the inkjet heads 46 and thereby causes the inks to be ejected from the nozzles.

The ink cartridge mounting portions 48 are portions on which the ink cartridges 49 are mounted. The ink cartridge mounting portions 48 are configured such that the ink cartridges 49 can be detachably attached thereto.

The ink cartridges 49 contain the inks used for the printing. The ink cartridges 49K, 49C, 49M, 49Y contain the black ink, the cyan ink, the magenta ink, and the yellow ink, respectively. An ink tag 51 (see FIG. 4) holding ink data is attached to each of the ink cartridges 49. The ink cartridges 49 can be detachably attached to the ink cartridge mounting portions 48.

The upper conveyer 4 conveys the sheet P conveyed by the belt conveyer 31, while U-turning the sheet P such that the traveling direction thereof is changed from rightward to leftward. The upper conveyer 4 includes multiple pairs of upper conveyance rollers 55.

The upper conveyance rollers 55 convey the sheet P along the conveyance route. The most downstream pair of upper conveyance rollers 55 is arranged in an upstream portion of the reverse route RR. The other upper conveyance rollers 55 are arranged along the normal route RC between the belt conveyer 31 and the sheet discharger 5. The upper conveyance rollers 55 are driven by a not-illustrated motor.

The sheet discharger 5 discharges the printed sheet P. The sheet discharger 5 includes a switching unit 56, sheet discharge rollers 57, and a sheet receiving tray 58.

The switching unit 56 switches the conveyance route of the sheet P between the sheet discharge route RD and the reverse route RR. The switching unit 56 is arranged at a branching point between the sheet discharge route RD and the reverse route RR. The switching unit 56 is driven by a not-illustrated solenoid.

The sheet discharge rollers 57 convey the sheet P guided to the sheet discharge route RD by the switching unit 56 and discharge the sheet P to the sheet receiving tray 58. The sheet discharge rollers 57 are arranged between the switching unit 56 and the sheet receiving tray 58 in the sheet discharge route RD. The sheet discharge rollers 57 are driven by a not-illustrated motor.

The sheet receiving tray 58 is a tray on which the sheets P subjected to printing and discharged by the sheet discharge rollers 57 are stacked. The sheet receiving tray 58 has a tray shape protruding from the case 1A and is installed to be tilted.

The reverse unit 6 reverses the sheet P subjected to printing on one side and conveys the sheet P to the registration rollers 26 in duplex printing. The reverse unit 6 includes reverse rollers 61, a switchback unit 62, sheet refeed rollers 63, and a switching gate 64.

The reverse rollers 61 temporarily load the sheet P conveyed by the upper conveyance rollers 55 of the upper conveyer 4 onto the switchback unit 62 and then unload the sheet P from the switchback unit 62 to convey the sheet P to the sheet refeed rollers 63. The reverse rollers 61 are arranged on the reverse route RR between the most downstream pair of upper conveyance rollers 55 and a loading opening of the switchback unit 62. The reverse rollers 61 are driven by a not-illustrated motor.

The switchback unit 62 is a space into which the reverse rollers 61 temporarily load the sheet P. The switchback unit 62 is formed in a lower portion of the sheet receiving tray 58.

A portion of the switchback unit 62 near the reverse rollers 61 is opened to load the sheet P.

The sheet refeed rollers 63 convey the sheet P conveyed by the reverse rollers 61, to the registration rollers 26. The sheet refeed rollers 63 are arranged on the reverse route RR between the pair of reverse rollers 61 and the pair of registration rollers 26. The sheet refeed rollers 63 are driven by a not-illustrated motor.

The switching gate 64 guides the sheet P conveyed by the upper conveyance rollers 55 to the reverse rollers 61. Moreover, the switching gate 64 guides the sheet P conveyed from the switchback unit 62 by the reverse rollers 61, to the sheet refeed rollers 63. The switching gate 64 is arranged near a center of mass of three portions of the most downstream pair of upper conveyance rollers 55, the pair of reverse rollers 61, and the pair of sheet refeed rollers 63.

Figure 4:
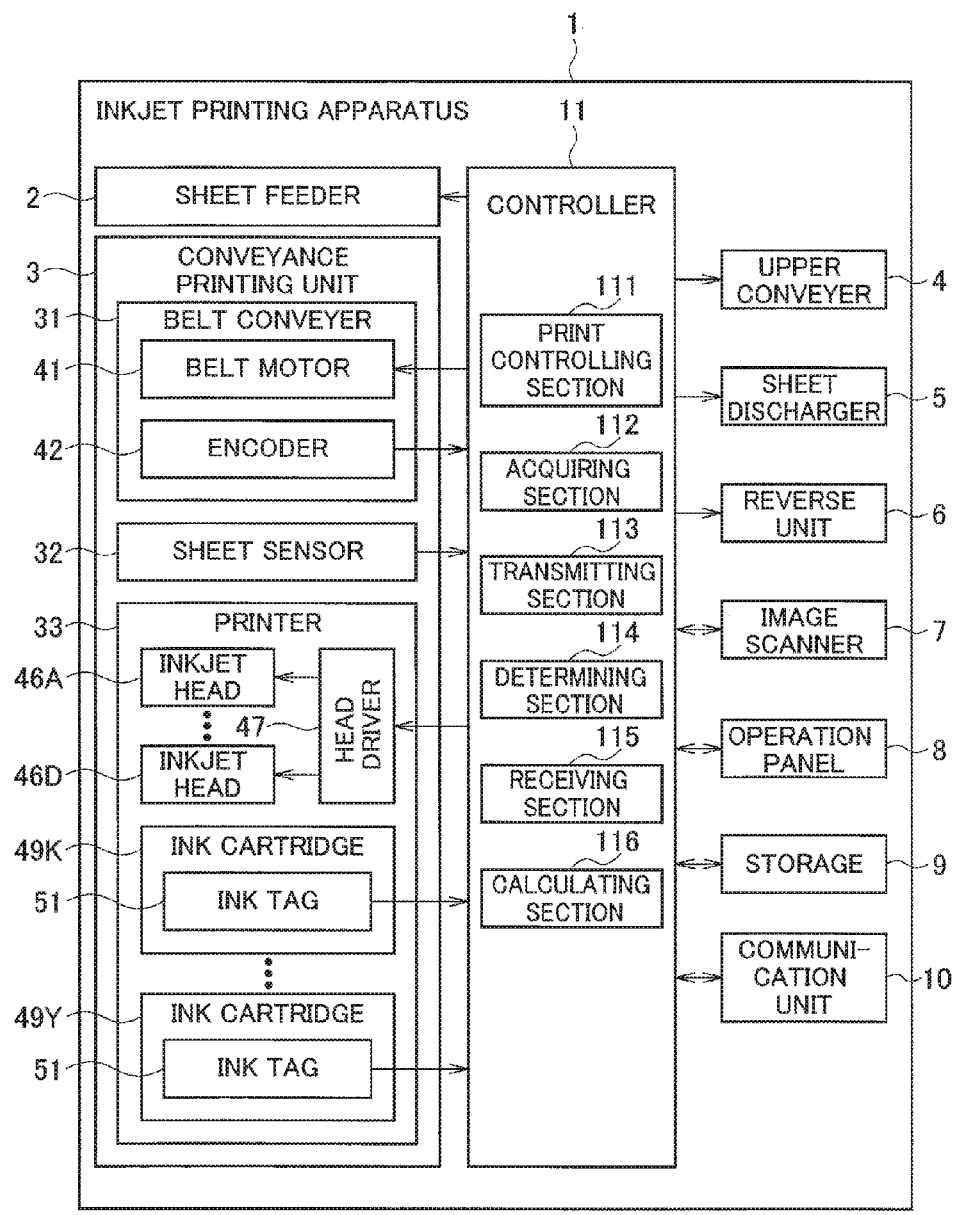
FIG. 4 is an explanatory view of arrangement of head modules in the embodiment.

Next, a configuration of the inkjet printing apparatus 1 is described with reference to FIG. 4. FIG. 4 is a block diagram illustrating functions of the inkjet printing apparatus 1. The inkjet printing apparatus 1 includes an image scanner 7, an operation panel 8, a storage 9, a communication unit 10, and a controller 11, in addition to the sheet feeder 2, the conveyance printing unit 3, the upper conveyer 4, the sheet discharger 5, and the reverse unit 6 which are illustrated in FIG. 2.

The image scanner 7 optically scans an original and generates image data. The image scanner 7 includes an original table, a light receiving element, a light source, a lens, a scanning mechanism, an automatic document feeder (all parts are not illustrated), and the like.

The operation panel 8 receives input operations made by the user and also displays various types of information and the like. The operation panel 8 includes an input unit having operation buttons, touch panels, and the like which are used by the user to perform various input operations and a display unit including a liquid crystal display panel and the like which display the various types of information and the like (both units are not illustrated).

The storage 9 includes a hard disk drive (HDD) and the like. The storage 9 stores various programs and the like. Moreover, the storage 9 stores preset image adjustment values for the color inks in the respective inkjet heads 46A to 46D. Specifically, the storage 9 stores the image adjustment values for the black ink in the inkjet head 46A, the image adjustment values for the cyan ink in the inkjet head 46B, the image adjustment values for the magenta ink in the inkjet head 46C, and the image adjustment values for the yellow ink in the inkjet head 46D. These image adjustment values are calculated by image adjustment processing to be described later.

The image adjustment values include an ink ejection timing correction value and a head drive voltage correction value.

The ink ejection timing correction value is a value for adjusting ink landing positions. The ink ejection timing correction value is a correction value applied to an ink ejection timing reference value for each line. The ink ejection timing reference value is a reference value of time from a timing at which the sheet sensor 32 detects a leading edge of the sheet to a timing at which the ink is ejected to each line in each head module 50. The ink ejection timing reference value is a value determined based a design value of the distance from the sheet sensor 32 to the nozzles in each head modules 50 in the direction in which the belt conveyer 31 conveys the sheet P (left-right direction). The ink ejection timing correction value is set for each head module 50.

The head drive voltage correction value is a value for adjusting print density. The head drive voltage correction value is a correction value applied to a head drive voltage reference value. The head drive voltage reference value is a value of voltage applied to the electrodes of each of the pressure chambers in the head modules 50 to eject a predetermined amount of ink droplet.

The head drive voltage correction value is calculated based on three density correction values of an inter-head module density correction value, a seam portion density correction value, and an in-head module density correction value. The head drive voltage correction value is set for each of the nozzles (pressure chambers) in the head modules 50.

The inter-head module density correction value is a correction value of drive voltage for reducing a density difference between the adjacent head modules 50 in the same inkjet head 46. The density difference between the adjacent head modules 50 is caused by an individual difference between the head modules 50.

The seam portion density correction value is a correction value of drive voltage for reducing density unevenness occurring in a seam portion between the adjacent head modules 50. The density unevenness occurring in the seam portion is caused by the head modules 50 attached while being misaligned in the main scanning direction (front-rear direction). When the head modules 50 are misaligned in the main scanning direction, a pitch between the nozzles in the seam portion becomes larger or smaller than a predetermined pitch. This causes density unevenness (stripe) in a portion of the printed image corresponding to the seam portion. The seam portion density correction value is used to increase or reduce the amount of ink ejected from each nozzle in the seam portion to reduce such density unevenness.

The in-head module density correction value is a correction value of drive voltage for reducing the density unevenness in the same head module 50. The density unevenness in the same head module 50 is caused by individual differences among the nozzles (pressure chambers).

Moreover, the storage 9 stores device configuration data and ink data.

The device configuration data indicates a configuration of the printer 33 and is set in the inkjet printing apparatus 1. The device configuration data includes IDs for identifying the inkjet heads 46A to 46D included in the printer 33, the number of ink colors of the ink cartridges 49K, 49C, 49M, 49Y used in the printing, arrangement information of the head modules 50, and the like. The device configuration data may be preset in manufacturing and stored in the storage 9 or inputted and set by the user and stored in the storage 9. Note that, when new device configuration data is to be stored in the storage 9, the new device configuration data is additionally stored in the storage 9 with previous device configuration data set before the new device configuration data being held in the storage 9.

The ink data indicates the characteristics of the inks contained respectively in the ink cartridges 49K, 49C, 49M, 49Y. The ink data includes hue values of the inks. Moreover, the ink data may include ink viscosities, coloring agent types, solvent types, and the like. The ink data is stored in ink tags 51 included in the ink cartridges 49 and is read from the ink tags 51 as necessary to be stored in the storage 9. Note that, when new ink data indicating the characteristics of an ink contained in the ink cartridge 49 is to be stored in the storage 9, the new ink data is additionally stored in the storage 9 with previous ink data indicating the characteristics of a previous ink used before the new ink being held in the storage 9.

The communication unit 10 is a communication interface between the inkjet printing apparatus 1 and the server 500. The communication unit 10 exchanges various types of data with the server 500 via the network NW.

The controller 11 controls operations of the units in the inkjet printing apparatus 1. The controller 11 includes a CPU, a RAM, a ROM, and the like. The controller 11 achieves control functions by using a CPU reading a control program.

The controller 11 includes a print controlling section 111, an acquiring section 112, a transmitting section 113, a determining section 114, a receiving section 115, and a calculating section 116.

The print controlling section 111 controls the units in the inkjet printing apparatus 1 to perform print processing of printing an image on the sheet P.

The acquiring section 112 acquires the device configuration data set in the inkjet printing apparatus 1 and the ink data indicating the characteristics of the inks. The acquiring section 112 acquires the ink data from the ink tags 51 included in the ink cartridges 49 containing the inks. The ink cartridges 49 correspond to expendable supply cartridges, the ink tags 51 correspond to expendable supply data storages, and the ink data corresponds to expendable supply data.

The acquiring section 112 stores the acquired device configuration data and ink data in the storage 9 in association with each other. Moreover, if the previous device configuration data set before the new device configuration data and the previous ink data indicating the characteristics of the previous ink used before the currently-used ink are stored in the storage 9 at the time of storing the new device configuration data and the new ink data, the acquiring section 112 causes the storage 9 to hold the previous device configuration data and the previous ink data.

The transmitting section 113 transmits the device configuration data and the ink data acquired by the acquiring section 112, to the server 500.

The determining section 114 determines whether to cause the transmitting section 113 to send the device configuration data and the ink data to the server.

Specifically, the determining section 114 refers to the storage 9 to acquire the previous device configuration data set before the currently-set device configuration data and the previous ink data indicating the characteristics of the previous ink used before the currently-used ink.

Then, the determining section 114 determines whether to cause the transmitting section 113 to send the device configuration data and the ink data to the server 500, based on a result of comparison between the previous device configuration data and the currently-set device configuration data and a result of comparison between the previous ink data and the currently-used ink data. Note that the comparison processing and processing according to the comparison results which are performed by the determining section 114 are described in detail later (see steps S12 to S18, FIG. 7, and the like).

The receiving section 115 receives, from the server 500, pattern image data indicating a pattern image and calculation program data for use to analyze the pattern image which are selected by the server 500 based on the device configuration data and the ink data sent by the transmitting section 113.

The calculating section 116 executes image adjustment processing to calculate the image adjustment values for adjusting the printer 33. Specifically, in the image adjustment processing, the calculating section 116 analyzes scanned image data, acquired by scanning the pattern image printed by the printer 33, by using the calculation program data and calculates the image adjustment values. The calculating section 116 stores the calculated image adjustment values in the storage 9.

The image adjustment processing is executed when the user inputs an instruction on the operation panel 8 or when an ink to be ejected from a certain inkjet head 46 is changed from an ink of a preset color to an ink of a different color. Note that the image adjustment processing is described in detail later.

Figures 5, 6:
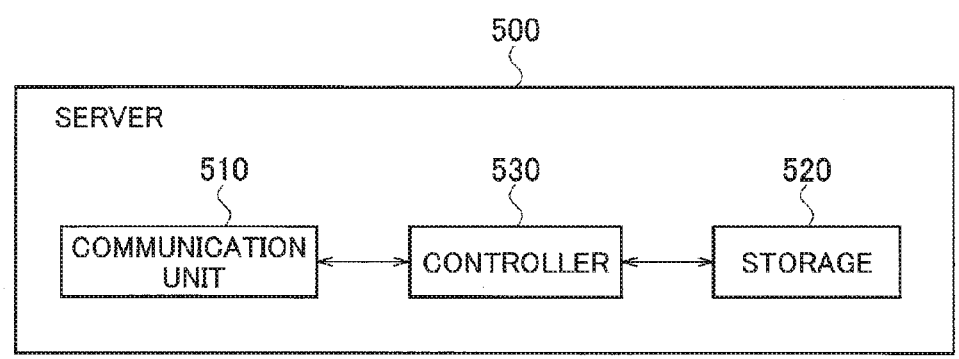
FIG. 5 is a block diagram illustrating functions of a server in the embodiment.
FIG. 6 is a diagram illustrating an example of a table stored in a storage of the server in the embodiment.

Next, a configuration of the server 500 is described. The server 500 consists of a computer. The server 500 sends various types of data to the inkjet printing apparatus 1 in response to requests from the inkjet printing apparatus 1. FIG. 5 is a block diagram depicting functions of the server 500.

As illustrated in FIG. 5, the server 500 includes a communication unit 510, a storage 520, and a controller 530.

The communication unit 510 is a communication interface between the inkjet printing apparatus 1 and the server 500. The communication unit 510 exchanges various types of data with the inkjet printing apparatus 1 via the network NW.

The storage 520 includes a hard disk drive (HDD) and the like. The storage 520 stores various programs and the like. Moreover, as illustrated in FIG. 6, the storage 520 stores the device configuration data, the ink data, the pattern image data, and the calculation program data in association with one another.

Note that, in the storage 520, the device configuration data, the ink data, the pattern image data, and the calculation program data are regularly updated such that an optimum combination can be acquired by using latest data.

The controller 530 controls operations of the units in the server 500. The controller 530 includes a CPU, a RAM, a ROM, and the like. The controller 530 achieves a control function by using a CPU reading a control program.

Upon receiving the device configuration data and the ink data from the inkjet printing apparatus 1 via the communication unit 510, the controller 530 refers to the storage 520 to retrieve the pattern image data and the calculation program data stored in association with the received device configuration data and ink data.

The controller 530 sends the retrieved pattern image data and calculation program data to the inkjet printing apparatus 1 via the communication unit 510. The controller 530 thus sends the inkjet printing apparatus 1 the pattern image data and the calculation program data which are optimal for the device configuration data and ink data received from the inkjet printing apparatus 1.

Operations of Inkjet Printing Apparatus 1

Next, operations of the inkjet printing apparatus 1 are described. First, brief description is given of operations performed when the inkjet printing apparatus 1 executes the print processing. Note that description is given below of an example in which simplex printing is performed.

When the inkjet printing apparatus 1 performs printing, the unprinted sheet P is conveyed from one of the external sheet feed tray 21 and the multiple internal sheet feed trays 23 in the sheet feeder 2 to the registration rollers 26, and is then conveyed to the belt conveyer 31 by the registration rollers 26. Then, the sheet P is subjected to printing by using the inks ejected from the inkjet heads 46A to 46D while being conveyed by the belt conveyer 31.

The sheet P subjected to printing is conveyed from the belt conveyer 31 to the upper conveyer 4 and is conveyed by the upper conveyance rollers 55 in the upper conveyer 4. The sheet P is guided to be conveyed from the normal route RC to the sheet discharge route RD by the switching unit 56 of the sheet discharger 5. Then the sheet P is discharged to the sheet receiving tray 58 by the sheet discharge rollers 57.

In the aforementioned printing operations, the controller 11 performs ink ejection control in the inkjet heads 46A to 46D by using the image adjustment values for the inkjet heads 46A to 46D stored in the storage 9.

Specifically, when the sheet sensor 32 detects the leading edge of the sheet P, the controller 11 starts to count the number of pulses outputted from the encoder 42. Then, the controller 11 controls each head module 50 based on the count value such that the ink is ejected at a timing shifted from the ink ejection timing reference value for each line by an amount corresponding to the ink ejection timing correction value. Moreover, the controller 11 drives each of the pressure chambers in the head modules 50 at drive voltage increased or reduced from the head drive voltage reference value by an amount corresponding to the head drive voltage correction value.

Figure 7:
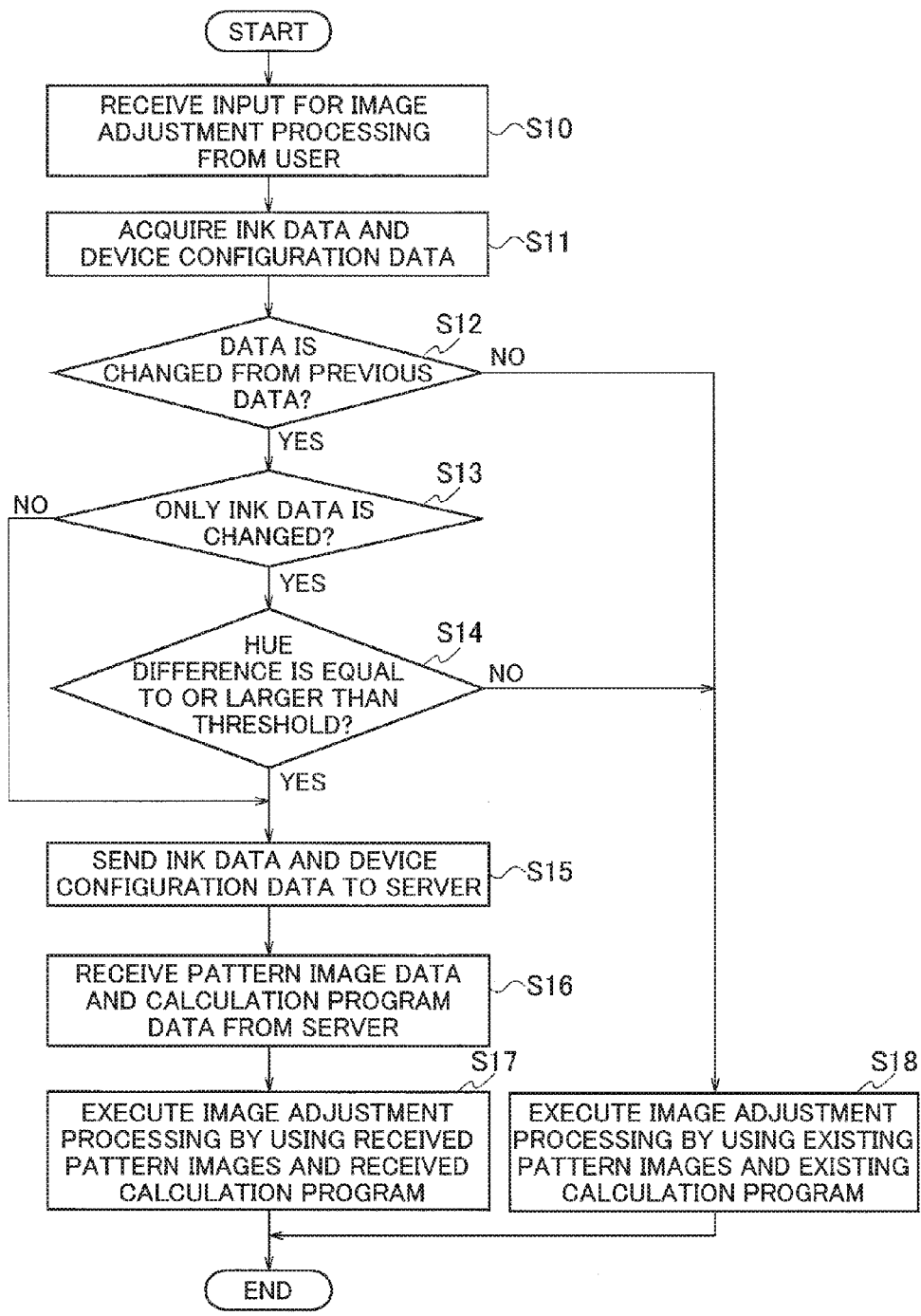
FIG. 7 is a flowchart depicting operations of the printing apparatus in the embodiment.

Next, description is given of operations performed when the inkjet printing apparatus 1 executes the image adjustment processing. FIG. 7 is a flowchart depicting the operations of the inkjet printing apparatus 1.

The flowchart depicted in FIG. 7 is a flowchart depicting the operations performed when the image adjustment processing is executed in response to an instruction from the user and depicts, for example, operations in the image adjustment processing executed at a timing desired by the user, such as after replacement of the inkjet head 46.

Moreover, description is given below of an example in which the image adjustment processing is executed for a new inkjet head 46A in response to an instruction from the user given after replacement to the new inkjet head 46A.

In step S10, after the replacement of the inkjet head 46A, the acquiring section 112 receives an input from the user which instructs execution of the image adjustment processing. For example, the acquiring section 112 displays an execution instruction reception screen for an image adjustment processing and receives the input from the user on the operation panel 8. For example, the acquiring section 112 displays the execution instruction reception screen for receiving the instruction of executing the image adjustment processing for the inkjet head 46A, and receives the input from the user.

Next, in step S11, the acquiring section 112 acquires the device configuration data and the ink data. Specifically, the acquiring section 112 acquires the currently-set device configuration data from the storage 9 and also acquires the ink data from the ink tag 51 included in the ink cartridge 49K for the inkjet head 46A. The acquiring section 112 stores the acquired device configuration data and ink data in the storage 9.

Next, in step S12 to S14, the determining section 114 determines whether to cause the transmitting section 113 to send the device configuration data and the ink data to the server. Specifically, the determining section 114 determines whether to cause the transmitting section 113 to send the device configuration data and the ink data to the server, based on the result of comparison between the previous device configuration data set before and the device configuration data acquired this time by the acquiring section 112 and the result of comparison between the previous ink data indicating the characteristic of the previous ink used before and the ink data acquired this time by the acquiring section 112.

In the following description, the device configuration data acquired this time by the acquiring section 112 in step S11 is referred to as current device configuration data, and the ink data acquired this time by the acquiring section 112 in step S11 is referred to as current ink data to simplify the description.

First, in step S12, the determining section 114 compares the previous device configuration data with the current device configuration data to determine whether the current device configuration data is changed. For example, the determining section 114 compares the entire data contents of the previous device configuration data with the entire data contents of the current device configuration data to determine whether the current device configuration data is changed. Note that the determining section 114 does not have to compare the entire data contents of the previous device configuration data with the entire data contents of the current device configuration data, and may instead compare, for example, file names, data sizes, time stamps (generation times), and the like to determine whether the current device configuration data is changed.

Similarly, the determining section 114 compares the previous ink data with the current ink data indicating the characteristics of the ink to determine whether the current ink data is changed.

Then, when the determining section 114 determines that the current device configuration data is not changed and the current ink data is also not changed ("No" in step S12), the determining section 114 performs the operation of step S18.

Meanwhile, when the determining section 114 determines that at least one of the current device configuration data and the current ink data is changed ("Yes" in step S12), in step S13, the determining section 114 determines whether only the ink data is changed.

Specifically, the determining section 114 compares the previous device configuration data with the current device configuration data. Then, the determining section 114 determines whether at least one of the IDs for identifying the inkjet heads 46, the number of colors of the inks ejected from the ink cartridges 49, and the arrangement information of the head modules 50 is changed. In other words, the determining section 114 determines whether a hardware configuration is changed.

Next, when the determining section 114 determines that the hardware configuration is changed and the ink data is thus not the only data changed ("No" in step S13), the determining section 114 performs the operation of step S15. For example, when the inkjet head 46A is replaced, the ID changes. Accordingly, the determining section 114 determines that the hardware configuration is changed, and performs the operation of step S15.

Meanwhile, when the determining section 114 determines that the hardware configuration is not changed and only the ink data is changed ("Yes" in step S13), in step S14, the determining section 114 refers to the previous ink data and the current ink data of the ink cartridge 49K. Then, the determining section 114 calculates the hue difference between the hue value of the ink included in the previous ink data and the hue value of the ink included in the current ink data.

Then, the determining section 114 determines whether the calculated hue difference is equal to or larger than a preset threshold. In this case, the hue values indicate the coordinates in a color space and the hue difference indicates the distance between two hue values in the color space. The hue values are coordinates in a color space which are expressed by, for example, the L*a*b* color system.

When the determining section 114 determines that the hue difference is not equal to or greater than the threshold ("No" in step S14), the determining section 114 performs the operation of the step S18. Here, the case where the hue difference is determined not to be equal to or greater than the threshold means that the hue difference has a small impact on the image adjustment values and there is no need to acquire the pattern image data and the calculation program data from the server 500.

In other words, the threshold is preset based on the relationship between the hue difference and the impact on the image adjustment values.

Meanwhile, when the determining section 114 determines that the hue difference is equal to or larger than the threshold ("Yes" in step S14), in step S15, the determining section 114 determines to acquire the pattern image data and the calculation program data from the server 500. Then, the transmitting section 113 sends the server 500 the current device configuration data and the current ink data which are acquired by the acquiring section 112.

In response to this, in the server 500, the controller 530 refers to the storage 520 to select the pattern image data and the calculation program data which are stored in association with the current device configuration data and the current ink data. Then, the controller 530 sends the selected pattern image data and calculation program data to the inkjet printing apparatus 1.

In step S16, the receiving section 115 receives, from the server 500, the pattern image data and the calculation program data which are selected by the server 500 based on the current device configuration data and the current ink data. The receiving section 115 stores the pattern image data and the calculation program data in the storage 9.

In step S17, the calculating section 116 executes the image adjustment processing by using the received pattern image data and calculation program data. The image adjustment processing is processing of calculating the image adjustment values for adjusting the printer 33. Specifically, the image adjustment processing is processing of calculating the image adjustment values for the ink ejected from each inkjet head 46. For example, when the inkjet head 46A is replaced, the image adjustment values for the ink ejected from the inkjet head 46A are calculated.

The calculating section 116 causes the printer 33 to print pattern images received from the server 500. In this case, the pattern image data includes a pattern image for ink landing position adjustment and a pattern image for print density adjustment.

The calculating section 116 first causes the inkjet head 46A to print the pattern image for ink landing position adjustment. The sheet P on which the pattern image for ink landing position adjustment is printed is discharged and then set on the image scanner 7 by the user. Then, the user performs an operation of instructing the image scanner 7 to perform image scanning, on the operation panel 8.

In response to this, the calculating section 116 causes the image scanner 7 to scan the printed pattern image. The image scanner 7 generates scanned image data acquired by scanning the printed pattern image. Then, the calculating section 116 reads the calculation program for analysis received from the server 500 and analyzes the scanned image data by using the calculation program to calculate the ink ejection timing correction value for the ink of the inkjet head 46A.

Next, the calculating section 116 causes the inkjet head 46A to print the pattern image for print density adjustment included in the pattern image data received from the server 500. In this case, the calculating section 116 causes the inkjet head 46A to print the pattern image by using the ink ejection timing correction value calculated in advance. The pattern image for print density adjustment includes pattern images for acquiring the inter-head module density correction value, the seam portion density correction value, and the in-head module density correction value, respectively.

Hereafter, the calculating section 116 similarly causes the image scanner 7 to scan the printed pattern image and analyzes the generated scanned image data by using the calculation program for analysis received from the server 500 to calculate the inter-head module density correction value, the seam portion density correction value, and the in-head module density correction value. Then, the calculating section 116 calculates the head drive voltage correction value satisfying all three of the inter-head module density correction value, the seam portion density correction value, and the in-head module density correction value, in consideration of the three density correction values. The image adjustment processing is thereby completed.

Meanwhile, when the determining section 114 determines that the current device configuration data and the current ink data are not changed ("No" in step S12) or determines that the hue difference is not equal to or larger than the threshold ("No" in step S14), in step S18, the calculating section 116 executes the image adjustment processing by using the existing pattern images and the existing calculation program. Specifically, the calculating section 116 executes the image adjustment processing by using the existing pattern image data and the existing calculation program data which are stored in the storage 9, instead of the pattern image data and the calculation program data which are received from the server 500.

Figure 8:
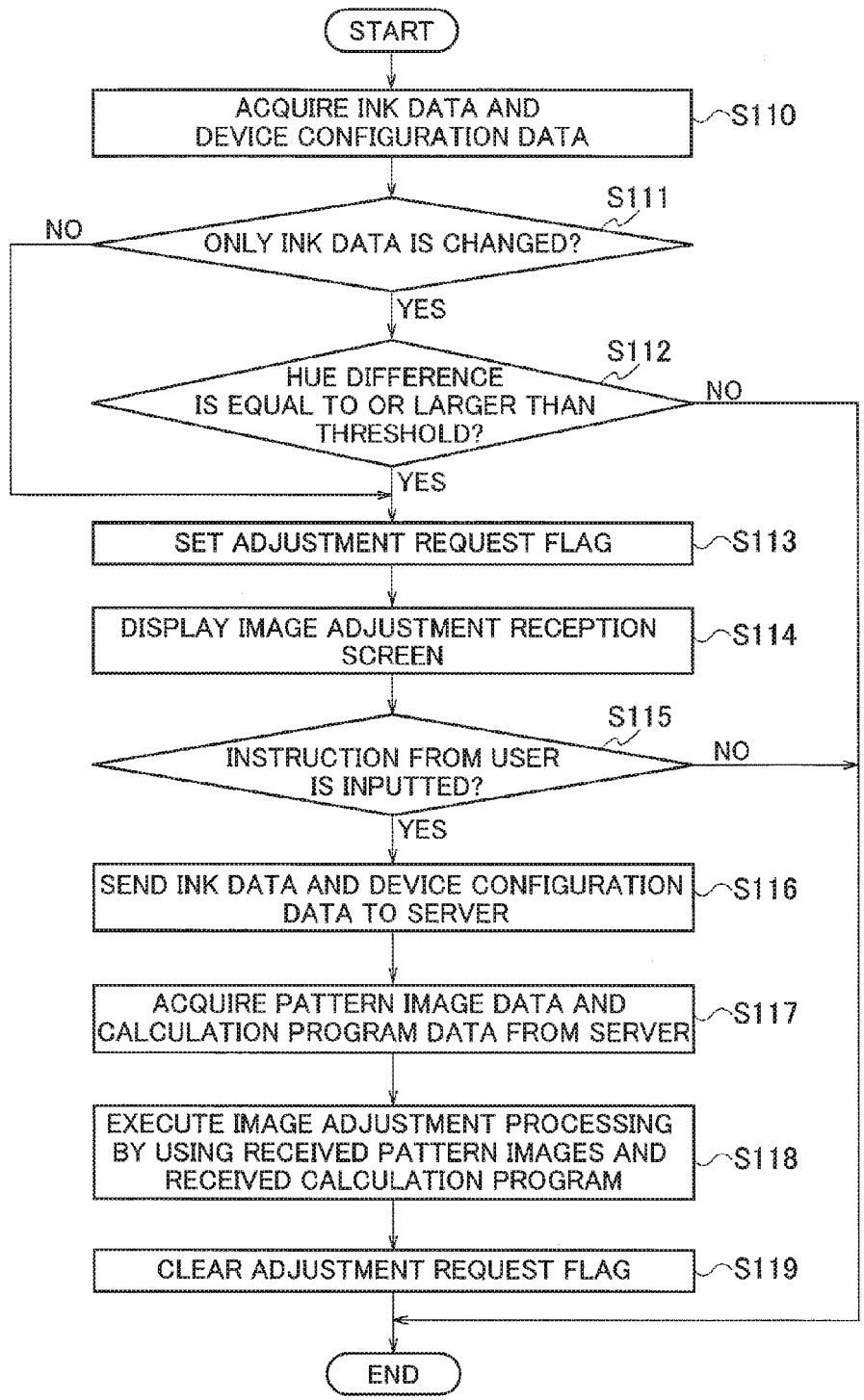
FIG. 8 is a flowchart depicting operations of the printing apparatus in the embodiment.

Next, description is given of operations performed when the ink cartridge 49 is replaced and the image adjustment processing is executed. FIG. 8 is a flowchart depicting operations of the ink cartridge 49 in the embodiment. In this case, description is given of an example in which the ink cartridge 49K containing the black (K) ink is replaced by an ink cartridge 49R containing a different ink.

In step S110, in the controller 11, when the acquiring section 112 detects that the ink cartridge 49K is replaced by the ink cartridge 49R, the acquiring section 112 acquires the device configuration data from the storage 9 and acquires the ink data from the ink tag 51 included in the ink cartridge 49R.

In step S111, the determining section 114 determines whether only the ink data is changed. When the determining section 114 determines that the ink data is not the only data changed ("No" in step S111), the determining section 114 performs the operation of step S113.

For example, when the ink cartridge 49K is replaced by the ink cartridge 49R, the determining section 114 determines that only the ink data is changed ("Yes" in step S111).

When the determining section 114 determines that only the ink data is changed ("Yes" in step S111), in Step S112, the determining section 114 refers to the previous ink data and the current ink data. For example, the determining section 114 refers to the previous ink data of the ink cartridge 49K and the current ink data of the ink cartridge 49R. Then, the determining section 114 calculates the hue difference between the hue value of the ink in the ink cartridge 49K which is included in the previous ink data and the hue value of the ink in the ink cartridge 49R which is included in the current ink data. When the determining section 114 determines that the hue difference is not equal to or larger than the threshold ("No" in step S112), the determining section 114 terminates the operation.

Meanwhile, when the determining section 114 determines that the hue difference is equal to or larger than the threshold ("Yes" in step 112), in step S113, the determining section 114 sets an adjustment request flag. The adjustment request flag is a flag indicating that the image adjustment processing should be executed, and is set, for example, from "0" to "1."

In step S114, the determining section 114 displays the image adjustment reception screen on the operation panel 8 to notify the user that the image adjustment processing should be executed, and receives the input from the user instructing execution of the image adjustment processing. For example, the determining section 114 displays the image adjustment reception screen to notify the user that the image adjustment processing corresponding to the ink cartridge 49R should be executed on the inkjet head 46A.

In step S115, the determining section 114 determines whether the user has inputted the instruction of executing the image adjustment processing on the operation panel 8. The determining section 114 terminates the operation when the user inputs no instruction ("No" in step S115).

Meanwhile, when the determining section 114 determines that the user has inputted the instruction ("Yes" in step S115), in step S116, the transmitting section 113 sends the device configuration data and the ink data to the server 500. Specifically, the transmitting section 113 sends the device configuration data and the ink data of the ink cartridge 49R to the server 500.

Note that, since the operations of steps S116 to S118 are the same as the operations of steps S15 to S17 described above, detailed description thereof is omitted.

Then, in step S119, when the image adjustment processing is completed, the calculating section 116 clears the adjustment request flag. For example, the calculating section 116 sets the adjustment request flag from "1" to "0."

Next, description is given of operations performed when the inkjet printing apparatus 1 is turned on and the image adjustment processing is executed. FIG. 9 is a flowchart depicting the operations in the inkjet printing apparatus 1. The operations depicted in the flowchart of FIG. 9 are operations performed when the image adjustment processing is executed based on the adjustment request flag depicted in the flowchart of FIG. 8.

First, in step S210, when the inkjet printing apparatus 1 is turned on, the determining section 114 determines whether the adjustment request flag is set to "1." When the determining section 114 determines that the adjustment request flag is not set to "1" ("No" in step S210), the determining section 114 terminates the operation. Specifically, the determining section 114 determines that execution of the image adjustment processing is unnecessary, and terminates the operation.

Meanwhile, when the determining section 114 determines that the adjustment request flag is set to "1," in step S211, the determining section 114 displays the image adjustment reception screen on the operation panel 8 to notify the user that the image adjustment processing should be executed, and receives the input from the user instructing execution of the image adjustment processing.

Note that, since the operations of steps S212 to S216 are the same as the operations of steps S115 to S119 described above, description thereof is omitted.

As described above, when the adjustment request flag is set to "1" and the inkjet printing apparatus 1 is in the state where the image adjustment processing should be executed, the inkjet printing apparatus 1 displays the image adjustment reception screen upon being turn-on and urges the user to instruct the execution of the image adjustment processing.

Operations and Effects

As described above, in the inkjet printing apparatus 1, the acquiring section 112 acquires the device configuration data and the expendable supply data. Moreover, the transmitting section 113 sends the device configuration data and the expendable supply data to the server, and the receiving section 115 receives the pattern image data indicating the pattern image and the calculation program data for use to analyze the pattern image which are selected by the server 500 based on the device configuration data and the expendable supply data. Then, the calculating section 116 analyzes the scanned image data, acquired by scanning the pattern image printed by the printer 33 based on the pattern image data, by using the calculation program data and calculates the image adjustment values.

The inkjet printing apparatus 1 can thereby acquire the pattern image data and the calculation program data for use to analyze the pattern image data from the server 500 and calculate the image adjustment values in such cases where, for example, the ink provided in the apparatus in default is changed to a different ink. Accordingly, the inkjet printing apparatus 1 can appropriately acquire the image adjustment values in response to the change of the ink and the like.

Moreover, the server 500 can select the pattern image data and the calculation program data optimal for the device configuration data and the expendable supply data. Accordingly, the inkjet printing apparatus 1 can optimize the image adjustment values based on the optimal pattern image data and calculation program data, and suppress a decrease in image quality.

Furthermore, in the inkjet printing apparatus 1, the storage 9 stores the previous device configuration data and the previous ink data, and the determining section 114 determines whether to cause the transmitting section 113 to send the device configuration data and the expendable supply data to the server 500, based on the result of comparison between the previous device configuration data and the current device configuration data and the result comparison between the previous expendable supply data and the current expendable supply data.

The inkjet printing apparatus 1 thereby sends the device configuration data and the expendable supply data to the server 500 only when the sending is determined to be necessary based on the comparison results. Accordingly, it is possible to prevent unnecessary sending of the device configuration data and the expendable supply data and to prevent receiving of the unnecessary pattern image data and the unnecessary calculation program data from the server 500. Moreover, since it is possible to prevent receiving of the unnecessary pattern image data and the unnecessary calculation program data from the server 500, the calculating section 116 can be prevented from wastefully executing the image adjustment processing of calculating the image adjustment values by using the calculation program data.

Moreover, in the inkjet printing apparatus 1, the acquiring section 112 acquires the ink data from the ink tag 51 included in the ink cartridge 49. The ink data can be thereby easily acquired from the ink tag 51 without the user performing work of inputting the ink data and the like, and the usability is enhanced by acquiring the ink data.

Moreover, in the conventional technique, in order to execute the image adjustment processing for various types of inks such as functional inks and spot color inks, various pieces of pattern image data and various pieces of calculation program data need to be stored in advance in the inkjet printing apparatus 1. Meanwhile, in the inkjet printing apparatus 1 in the embodiment, the necessary pattern image data and calculation program data can be acquired from the server 500 as necessary. Accordingly, the capacity of a storage for holding the pattern image data and the calculation program data can be reduced, and this contributes to reduction of a cost due to an increase in capacity.

Although the present invention has been described above in detail by using the aforementioned embodiment, it is apparent to those skilled in the art that the present invention is not limited to the embodiment described in this specification.

For example, although description is given of the example in which the printing apparatus is the inkjet printing apparatus 1 in the aforementioned embodiment, the present invention is not limited to this. For example, the printing apparatus may be a toner printing apparatus configured to perform printing by an electrophotographic method (so-called toner-based method) in which toner attached to a surface of a photosensitive drum is transferred onto a print sheet. In this case, the expendable supply is the toner, and the expendable supply cartridge is a toner cartridge.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A printing apparatus comprising:
    a communication interface configured to communicate with a server via a network;
    a printer configured to print an image using an expendable supply; and
    a controller configured to control the communication interface and the printer,
    wherein the controller is configured to:
        acquire device configuration data indicating a configuration of the printer and expendable supply data indicating a characteristic of the expendable supply;
        drive the communication interface to send the device configuration data and the expendable supply data to the server;
        drive the communication interface to receive, from the server, pattern image data and calculation program data selected by the server based on the sent device configuration data and the sent expendable supply data, the pattern image data indicating a pattern image, the calculation program data being for use to analyze the pattern image; and
        analyze scanned image data using the calculation program data and calculate an image adjustment value for adjusting the printer, the scanned image data being acquired by scanning the pattern image printed by the printer.

2. The printing apparatus according to claim 1, further comprising a storage configured to store previous device configuration data set before the device configuration data and previous expendable supply data indicating a characteristic of a previous expendable supply used before the expendable supply,
    wherein the controller is configured to determine whether to send the device configuration data and the expendable supply data to the server, based on a result of comparison between the previous device configuration data and the device configuration data currently acquired and a result of comparison between the previous expendable supply data and the expendable supply data currently acquired.

3. The printing apparatus according to claim 2, further comprising an expendable supply data storage included in an expendable supply cartridge containing the expendable supply, wherein the controller is configured to acquire the expendable supply data from the expendable supply data storage.

4. The printing apparatus according to claim 1, further comprising an expendable supply data storage included in an expendable supply cartridge containing the expendable supply,
    wherein the controller is configured to acquire the expendable supply data from the expendable supply data storage.

* * * * *